(12) United States Patent
Gauci et al.

(10) Patent No.: US 11,335,009 B2
(45) Date of Patent: May 17, 2022

(54) METHOD AND SYSTEM FOR AERODROME TAXIWAY SURFACE MARKING DETECTION

(71) Applicant: University of Malta, Msida (MT)

(72) Inventors: Jason Gauci, Rabat (MT); Aman Batra, Haryana (IN)

(73) Assignee: UNIVERSITY OF MALTA, Msida (MT)

( * ) Notice: Subject to any disclaimer, the term of this patent is extended or adjusted under 35 U.S.C. 154(b) by 0 days.

(21) Appl. No.: 16/858,833

(22) Filed: Apr. 27, 2020

(65) Prior Publication Data

US 2021/0334984 A1   Oct. 28, 2021

(51) Int. Cl.

| | |
|---|---|
| *G06T 7/00* | (2017.01) |
| *G06T 7/246* | (2017.01) |
| *G06T 7/13* | (2017.01) |
| *G06T 7/90* | (2017.01) |
| *B64F 1/00* | (2006.01) |
| *B64D 47/08* | (2006.01) |
| *G06V 10/75* | (2022.01) |

(52) U.S. Cl.
CPC ............ *G06T 7/246* (2017.01); *B64D 47/08* (2013.01); *B64F 1/002* (2013.01); *G06T 7/13* (2017.01); *G06T 7/90* (2017.01); *G06V 10/751* (2022.01); *G06V 10/758* (2022.01); *G06T 2207/10016* (2013.01); *G06T 2207/10032* (2013.01); *G06T 2207/30241* (2013.01)

(58) Field of Classification Search
None
See application file for complete search history.

(56) References Cited

U.S. PATENT DOCUMENTS

| 6,305,484 | B1 | 10/2001 | Leblanc | |
|---|---|---|---|---|
| 7,673,831 | B2 | 3/2010 | Steele et al. | |
| 2005/0069207 | A1* | 3/2005 | Zakrzewski | ........ B64D 45/0053 |
| | | | | 382/190 |
| 2007/0154068 | A1* | 7/2007 | Stein | ........................ G01S 17/93 |
| | | | | 382/106 |
| 2010/0195932 | A1* | 8/2010 | Wang | .................... G06T 3/0068 |
| | | | | 382/284 |
| 2011/0127366 | A1 | 6/2011 | Becker | |
| 2011/0130963 | A1* | 6/2011 | Feyereisen | ............. G01C 23/00 |
| | | | | 701/455 |
| 2015/0158513 | A1* | 6/2015 | Costa | .................... B61L 23/041 |
| | | | | 348/144 |

(Continued)

FOREIGN PATENT DOCUMENTS

| DE | 102008035342 B4 | 6/2011 |
|---|---|---|
| EP | 2303697 A2 | 4/2011 |
| FR | 2970364 A1 | 7/2012 |

OTHER PUBLICATIONS

Navigation data extraction from monocular camera images during final approach. Hiba et al. Jun. 2018 (Year: 2018).*

(Continued)

*Primary Examiner* — Delomia L Gilliard
(74) *Attorney, Agent, or Firm* — Mark M. Friedman

(57) ABSTRACT

There is provided methods and systems for controlling airplane taxiing, including detecting aerodrome taxiway lines and estimating cross-track error.

20 Claims, 17 Drawing Sheets
(14 of 17 Drawing Sheet(s) Filed in Color)

(56) References Cited

U.S. PATENT DOCUMENTS

| | | | | |
|---|---|---|---|---|
| 2016/0039436 | A1* | 2/2016 | Bhagwatkar | B61L 23/00 |
| | | | | 348/148 |
| 2018/0097288 | A1* | 4/2018 | DiDomenico | G05D 1/0094 |
| 2019/0287252 | A1* | 9/2019 | Wallin | G06T 7/11 |
| 2020/0122820 | A1* | 4/2020 | Dame | B64C 39/024 |
| 2020/0202733 | A1* | 6/2020 | Staudinger | G06T 7/246 |

OTHER PUBLICATIONS

A Technical Survey on DBSCAN Clustering Algorithm. Suthar et al. (Year: 2013).*
Robert Morris, et al, "Safe Tug, Semi-Autonomous Aircraft Towing Vehicles", National Aeronautics and Space Administration, Mar. 2015.
Jen Bradley, "How Autonomous Vehicles Fit The Future of Airports", in GSE, Pushbacks, Tractors & Utility Vehicles, 8 Pages, Dec. 2018.
Robert Morris, et al., "Self-Driving Aircraft Towing Vehicles: A Preliminary Report:, in, Artificial Intelligence for Transportation: Advice, Interactivity and Actor Modeling". Papers From the 2015 AAAI Workshop, pp. 41-48, 2015.
IAI TaxiBot. "Airplane taxi: Taxibot preforms push back operations and procedures", from, https://www.iai.co.il/p/taxibot, 5 Pages, Date is prior to filing date.
Aircraft taxiing along with their engines shut down: Safran believes this is a winner!, from https://www.safran-landing-systems.com/systems-equipment/electric-taxiing-0, 4 Pages, Date is prior to filing date.
Scott McCartney, "When an Airplane Needs a Taxi: New Devices Aim to Boost Fuel Efficiency and Save Passangers Time at the Airport Gate", from. The Wall Street Journal. Dec. 24, 2013.
Damon Fordham, Mia Stephens, Ashley Chymiy, Hazel Peace, Gareth Horton, Charles Walker, Mike Kenney, Clint Morrow, Mikhail Chester, Yu Zhang, and Paul Sichko, "Deriving Benefits from Alternative Aircraft-Taxi Systems", from http://apps.trb.org/cmsfeed/TRBNetProjectDisplay.asp?ProjectID=3696, 29 pages, 2016.
"Optimization of Future Ground Operations for Aircraft", from Universidad Rey Juan Carlos, from, http://www.aerospaceenngineering.es/wp-content/uploads/2013/12/main_Surf_operations.pdf, 14 pages, 2013.
Indira Deonandan and Hamsa Balakrishnan, "Evaluation Strategies for Reducing Taxi-out Emissions at Airports", Massachusetts Institute of Technology, from, http://www.mit.edu/, 2010.

M.I. MD Ithnan, T. Selderbeek, W.W.A. Beelaerts van Blokland, and G. Lodewijks, "Aircraft Taxiing Strategy Optimization", from Department Maritime & Transport Technology, Technology University of Delf, from http://rstrail.nl/new/wp-content/uploads/2015/02/izzudin_ithnan.pdf, 9 pages, 2013.
R. Kebabjian, "Causes of Fatal Accidents by Decade", Plane Crash Info, from http://www.planecrashinfo.com/cause.htm, 1997-2019.
"Empower your pilots with fast situational awareness", Jeppesen Airport Moving Maps, from http://ww2.jeppesen.com/aviation/products/airport-moving-maps/airport-moving-maps.jsp, 2020 (Prior to filing date).
E. S. Katz, "2.2 Advanced Taxiway Guidance System (ATGS)", from https://www.hq.nasa.gov/office/aero/events/chicago/atgs.htm. Date is prior to filing date.
"Advanced Surface Movement Guidance and Control System/A-SMGCS", from http://www.honeywellairports.com/documents/9Sep16/ASMGCS-SB_Rev1_0916_V02.pdf, Dec. 1, 2019.
Kevin Theuma,David Zammit-Mangion,Jason Gauci,Kenneth Chircop andNicolas Riviere, "A Particle Filter for Ground Obstacle Tracking in the Airfield," Jan. 2019.
Kevin Theuma and David Zammit Mangion, "An Image Processing Algorithm for Ground Navigation of Aircraft," 2015.
M. Bertozzi and A. Broggi, "GOLD: A Parallel Real-Time Stereo Vision System for Generic Obstacle and Lane Detection", Jan. 1998.
Kuo Yu Chiu, Sheng-Fuu Lin, "Lane Detection using Color-Based Segmentation," 2005.
B. Yu and A. K. Jain, "Lane Boundary Detection Using A Multiresolution Hough Transform," 1997.
Y. Wang, D. Shen and E. K. Teoh, "Lane Detection using spline model," Pattern Recognition Letters, vol. 21, issue 8, pp. 677-689, 2000.
A. Criminisi,et al., "A Plane Measuring Device," in, Imaging and Vision Computing, vol. 17, Issue 8, pp. 625-634 (1999).
Dean Pomerleau, "RALPH: Rapidly Adopting Lateral Position Handler," in, Proceedings of the Intelligent Vehicles '95. Symposium, pp. 506-511, (1995).
M. Ester, et al., "A Density Based Algorithm for Discovering Clusters in Large Spatial Databases with Noise," in, KDD'96 Proceedings of the Second International Conference on Knowledge Discovery and Data Mining, pp. 226-231 (Aug. 1996).
Batra, Aman et al. "Aerodrome Taxiway Line Detection and Cross-Track Error Estimation using Computer Vision Techniques" Conference: 2020 IEEE Aerospace Conference; DOI:10.1109/AERO47225.2020.9172787; Mar. 2020.

* cited by examiner

Converging taxiway on the left (m < 0)   Converging taxiway on the right (m > 0)

Diverging taxiway on the left (m > 0)   Diverging taxiway on the right (m < 0)

METHOD AND SYSTEM FOR AERODROME TAXIWAY SURFACE MARKING DETECTION

TECHNICAL FIELD

Embodiments of the disclosure relate to methods and systems for use in airplane taxiing.

BACKGROUND

The airline industry continues to grow, with an ever-increasing number of flights, and accordingly, an ever-increasing number of taxi maneuvers to and from the runway for each flight. The increase in taxiing increases the probability for accidents, as R. Kebabjian, in "Plane Crash Information", http://www.planecrashinfor.com/cause.htm, reported that 12% of all airline accidents between 1959 and 2008 occurred during the taxi phase. Some of the causes of the accidents included obstacle misjudgment, and low visibility due to bad weather or nighttime operation.

SUMMARY

The present disclosure, also referred to herein as the disclosed subject matter, provides methods and systems for controlling airplane taxiing, including detecting aerodrome taxiway lines (typically in the form of surface markings) and estimating cross-track error, for use in administering and controlling aircraft taxiing. The system includes an image processor for processing the images captured by an electro-optical camera, such as a visible imaging sensor, mounted on an aircraft and processing hardware and software for guiding the airplane taxiing process. The horizontal position of the aircraft relative to the taxiway centerline, known as the cross-track error, is also measured, and may be used to alert pilots when they deviate from the center line.

Embodiments of the disclosed subject matter are directed to a method for detecting taxiway lines in an aerodrome. The method comprises: obtaining digital images of an aircraft indicative of the forward direction of movement of the aircraft; detecting pixels corresponding to taxiway lines in a digital image including: 1) determining whether there are pixels matching a range of predetermined colors associated with taxiway lines, and, 2) determining whether there are pixels defining an edge of a taxiway line; in a subsequent digital image, determining whether the movement of the aircraft is at least in a substantially straight line by analyzing at least a portion of the subsequent digital image corresponding to a region in front of the aircraft; and, detecting one or more taxiway lines within the subsequent digital image. The detecting the one or more taxiway lines with the subsequent digital image is performed by at least one of: a) if the movement of the aircraft is at least in a substantially straight line along the taxiway: generating a plurality of windows in succession in the subsequent digital image, to detect at least one taxiway line of the one or more taxiway lines for the aircraft to follow, each window of at least a predetermined number of pixels, and, the succession of each of the windows including positioning a successive window after a previous window to advance each successive window in a direction corresponding to at least one of the taxiway lines detected in the previous window, the at least one of the taxiway lines being detected based on analyzing the pixels in the previous window; or, b) if the movement of the aircraft is not at least in a substantially straight line along the taxiway, applying at least one clustering process to the pixels of the subsequent at least one digital image to detect the one or more taxi way lines. The method then tracks the one or more detected taxiway lines, as coordinated with the movement of the aircraft, by analyzing multiple successive frames of obtained digital images in the successive order of the frames until the one or more taxiway lines are no longer detected in a predetermined number of consecutive frames.

Optionally, the method is such that the obtaining the digital images is performed continuously and automatically.

Optionally, the method is such that it additionally comprises: obtaining a region of interest (ROI) within a digital image and converting the region of interest to a top-down digital image.

Optionally, the method is such that the converting includes performing a Homographic Transform on the digital image.

Optionally, the method is such that it additionally comprises: analyzing the top-down digital image based on Hue, Saturation, Value (HSV), to determine whether the color of each pixel in the top-down digital image matches a range of predetermined colors, and generating a first binary image based on pixels matching the range of predetermined colors.

Optionally, the method is such that it additionally comprises: analyzing the top-down digital image by performing a Canny edge detection process, to determine whether each pixel defines an edge of at least one of the taxiway lines, and generating a second binary image of the pixels which define the edges of the at least one of the taxiway lines.

Optionally, the method is such that it additionally comprises: creating a combined binary image from the first binary image and the second binary image.

Optionally, the method is such that the analyzing the pixels in the previous window includes at least one of: a) determining vertical taxiway lines by fitting a line to the non-zero pixels in the window; b) determining converging and/or diverging taxiway lines by: (1) computing a histogram of non-zero pixels in each column of the window; (2) determining the number of converging or diverging taxiway lines by determining the number of gaps in the histogram; and, (3) creating a window corresponding to each of the gaps, and fitting a line to the non-zero pixels in each of the created windows; and/or, c) determining horizontal taxiway lines by: (1) computing a histogram of non-zero pixels in each row of the window, and analyzing the peaks of the histogram; and, (2) creating a window in the direction of each horizontal taxiway line, and fitting a line to the non-zero pixels in each of the created windows.

Optionally, the method is such that it additionally comprises: determining the cross-track error of the aircraft from the at least one of the determined vertical taxiway lines.

Optionally, the method is such that the cross-track error is determined by performing template matching.

Optionally, the method is such that the at least one clustering process includes at least one of: detecting taxiway lines of the one or more taxiway lines which are separate from each other; or, detecting taxiway lines of the one or more taxiway lines by separating intersecting taxiway lines from each other.

Optionally, the method is such that the detecting the taxiway lines which are separate from each other includes: applying a Density-Based Spatial Clustering of Applications with Noise (DBSCAN) process to the combined binary image.

Optionally, the method is such that the detecting the taxiway lines of the one or more taxiway lines by separating intersecting taxiway lines from each other includes: detecting intersections of taxiway lines from the combined binary image, modifying the combined binary image including removing the non-zero pixels from the detected intersections of taxiway lines in the combined binary image; and, applying a DBSCAN process to the modified combined binary image.

Optionally, the method is such that the detecting intersections of taxiway lines from the combined binary image includes, processing the combined binary image including: analyzing a region of at least a predetermined number of pixels centered at each non-zero pixel in the combined binary image, and, determining whether the number of non-zero pixels in the region exceeds a certain threshold number.

Optionally, the method is such that the region is formed of quadrants and the determining whether the number of non-zero pixels in at least three of the quadrants of the region exceeds a certain threshold number.

Optionally, the method is such that the removing the non-zero pixels from the detected intersections of taxiway lines includes: in the combined binary image, 1) defining a circular region including a radius of a predetermined number of pixels, and, 2) removing any non-zero pixels from the circular region.

Optionally, the method is such that it additionally comprises: modeling at least one the taxiway lines by fitting at least one of: 1) a line, or 2) a curve, through each group of non-zero pixels corresponding to a taxiway line in the subsequent digital image, prior to the tracking the one or more detected taxiway lines.

Embodiments of the disclosed subject matter are directed to a computer system for detecting taxiway lines in an aerodrome. The computer system comprises: a non-transitory storage medium for storing computer components; and, a computerized processor for executing the computer components. The computer components comprise: a module for obtaining digital images, including those of an aircraft indicative of the forward direction of movement of the aircraft; a module for detecting pixels corresponding to taxiway lines in at least one of the obtained digital images including: 1) determining whether there are pixels matching a range of predetermined colors associated with taxiway lines, and, 2) determining whether there are pixels defining an edge of a taxiway line; a module for determining, from at least one of the obtained digital images, whether the movement of the aircraft is at least in a substantially straight line by analyzing at least a portion of the at least one digital image corresponding to a region in front of the aircraft; and, detecting one or more taxiway lines within the at least one obtained digital image, by performing at least one of: a) if the movement of the aircraft is at least in a substantially straight line along the taxiway: generating a plurality of windows in succession in the at least one obtained digital image, to detect at least one taxiway line of the one or more taxiway lines for the aircraft to follow, each window of at least a predetermined number of pixels; and, the succession of each of the windows including positioning a successive window after a previous window to advance each successive window in a direction corresponding to at least one of the taxiway lines detected in the previous window, the at least one of the taxiway lines being detected based on analyzing the pixels in the previous window; or, b) if the movement of the aircraft is not at least in a substantially straight line along the taxiway, applying at least one clustering process to the pixels of the at least one obtained digital image to detect the one or more taxiway lines; and, a module for tracking the one or more detected taxiway lines, as coordinated with the movement of the aircraft, by analyzing multiple successive frames of the obtained at least one digital image in the successive order of the frames until the one or more taxiway lines are no longer detected in a predetermined number of consecutive frames.

Optionally, the computer system is such that it additionally comprises: a camera, the camera for: 1) mounting on the aircraft, and, 2) for capturing digital images indicative of the forward direction of movement of the aircraft; and, the camera in electronic communication with the module for obtaining digital images.

Embodiments of the disclosed subject matter are directed to a computer usable non-transitory storage medium having a computer program embodied thereon for causing a suitably programmed system to detect taxiway lines in an aerodrome, by performing the following steps when such program is executed on the system. The steps comprise: obtaining digital images of an aircraft indicative of the forward direction of movement of the aircraft; detecting pixels corresponding to taxiway lines in a digital image including: 1) determining whether there are pixels matching a range of predetermined colors associated with taxiway lines, and, 2) determining whether there are pixels defining an edge of a taxiway line; determining, in a subsequent digital image, whether the movement of the aircraft is at least in a substantially straight line by analyzing at least a portion of the subsequent digital image corresponding to a region in front of the aircraft; and, detecting one or more taxiway lines within the subsequent digital image, by performing at least one of: a) if the movement of the aircraft is at least in a substantially straight line along the taxiway: generating a plurality of windows in succession in the subsequent digital image, to detect at least one taxiway line of the one or more taxiway lines for the aircraft to follow, each window of at least a predetermined number of pixels, and, the succession of each of the windows including positioning a successive window after a previous window to advance each successive window in a direction corresponding to at least one of the taxiway lines detected in the previous window, the at least one of the taxiway lines being detected based on analyzing the pixels in the previous window; or, b) if the movement of the aircraft is not at least in a substantially straight line along the taxiway, applying at least one clustering process to the pixels of the subsequent at least one digital image to detect the one or more taxiway lines; and, tracking the one or more detected taxiway lines, as coordinated with the movement of the aircraft, by analyzing multiple successive frames of obtained digital images in the successive order of the frames until the one or more taxiway lines are no longer detected in a predetermined number of consecutive frames.

Unless otherwise defined herein, all technical and/or scientific terms used herein have the same meaning as commonly understood by one of ordinary skill in the art to which the disclosure pertains. Although methods and materials similar or equivalent to those described herein may be used in the practice or testing of embodiments of the disclosed subject matter, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The patent or application file contains at least one drawing executed in color. Copies of this patent or patent application with color drawings will be provided by the Office upon request and payment of the necessary fee.

Some embodiments of the disclosed subject matter are herein described, by way of example only, with reference to the accompanying drawings. With specific reference to the drawings in detail, it is stressed that the particulars shown are by way of example and for purposes of illustrative discussion of embodiments of the disclosed subject matter. In this regard, the description taken with the drawings makes apparent to those skilled in the art how embodiments of the disclosure may be practiced.

Attention is now directed to the drawings, where like reference numerals or characters indicate corresponding or like components. In the drawings:

FIG. 1A-1 is a diagram of a vertical field of view of a camera mounted on the vertical stabilizer of an airplane in which embodiments of the disclosed subject matter are performed;

FIG. 1A-2 is a diagram of a horizontal field of view of the camera mounted on the vertical stabilizer of the airplane of FIG. 1A-1;

FIG. 1B is a diagram of an example architecture of the controller of the disclosed subject matter as in the Airplane of FIGS. 1A-1 and 1A-2;

FIG. 2 is a flow diagram of a process in accordance with embodiments of the disclosure;

FIG. 3 shows an input video frame with an outline of the Region of Interest (ROI);

FIG. 4 is a top-down view of the image of FIG. 3;

FIG. 5 is a binary image corresponding to color detection (left) and edge detection (right);

FIG. 6 is a combined binary image from the images of FIG. 5;

FIG. 7 is an image of an aircraft moving in a straight line (left) and performing a turn maneuver (right);

FIG. 8 is a diagram of the sliding window (SW) technique;

FIG. 9 are images for the Sliding Windows used to detect a vertical taxiway centerline (left) and the detected taxiway centerline (right);

Figure 10:
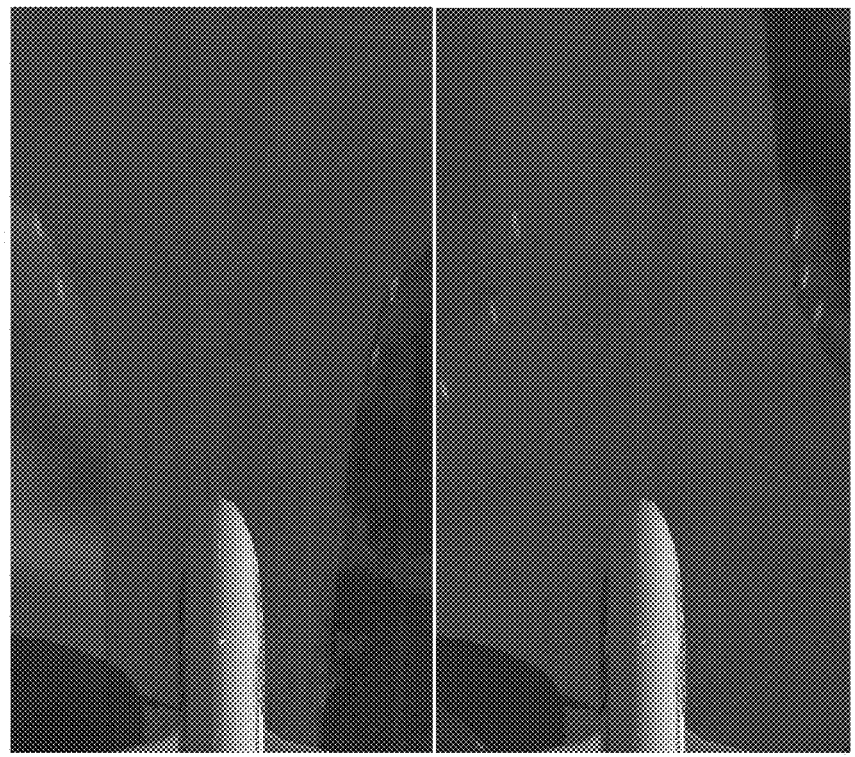
Figure 11:
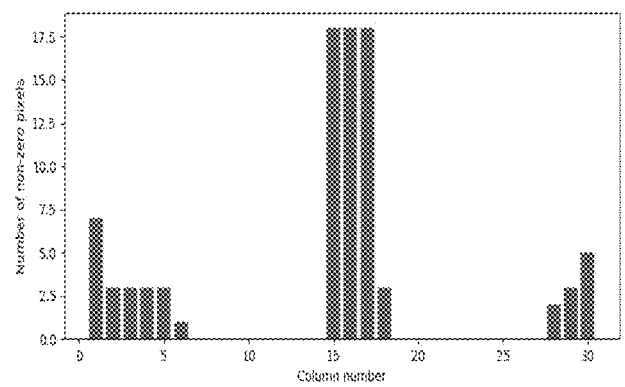
Figure 12:
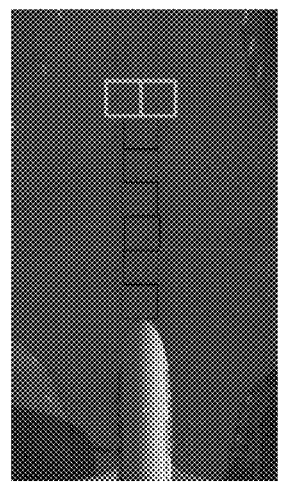
Figure 13:
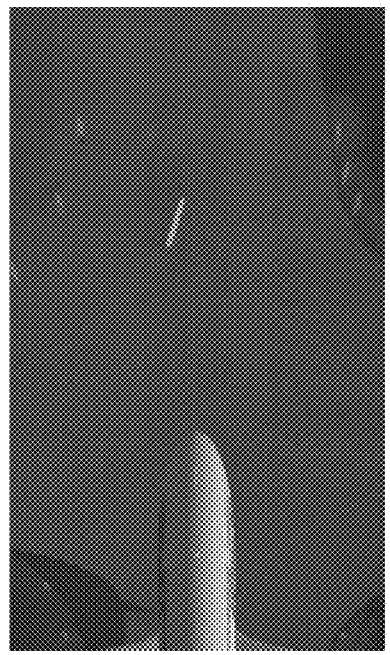
Figure 13:
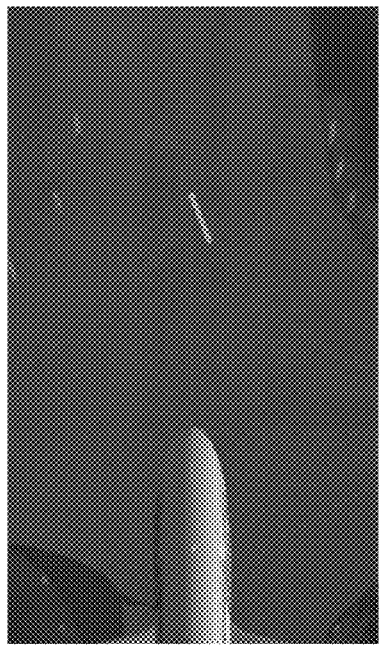
Figure 13:
Figure 13:
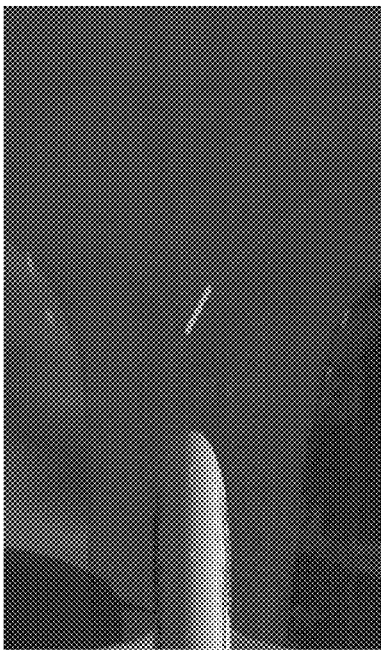

FIG. 10 shows images of diverging taxiway centerlines (left) and converging centerlines (right);

FIG. 11 is a histogram corresponding to two branching taxiways;

FIG. 12 is an image showing converging taxiway lines and sliding windows corresponding to the vertical taxiway centerline and taxiway intersection;

FIG. 13 shows graphical representations of the slopes corresponding to converging and diverging taxiway centerlines.

Figure 14:
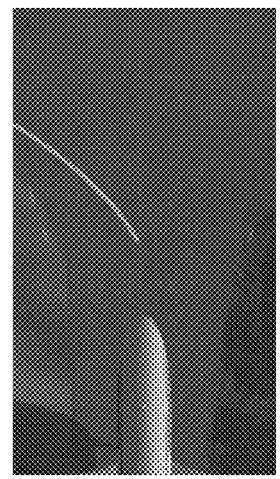
Figure 15:
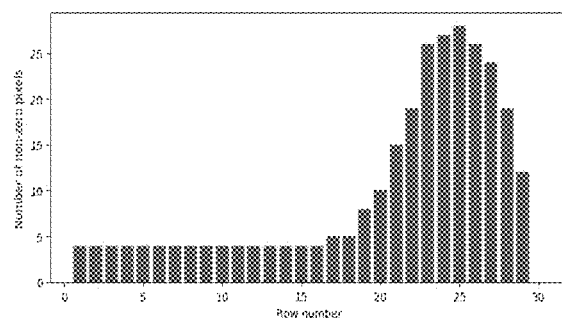
Figure 16:
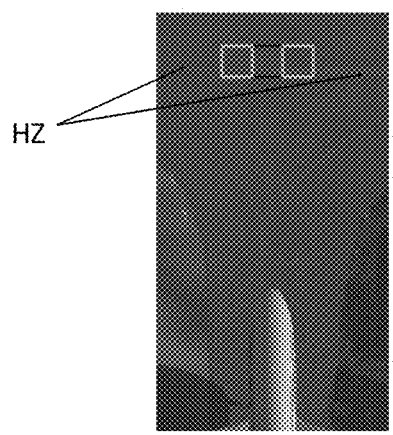
Figure 17:
Figure 18A:
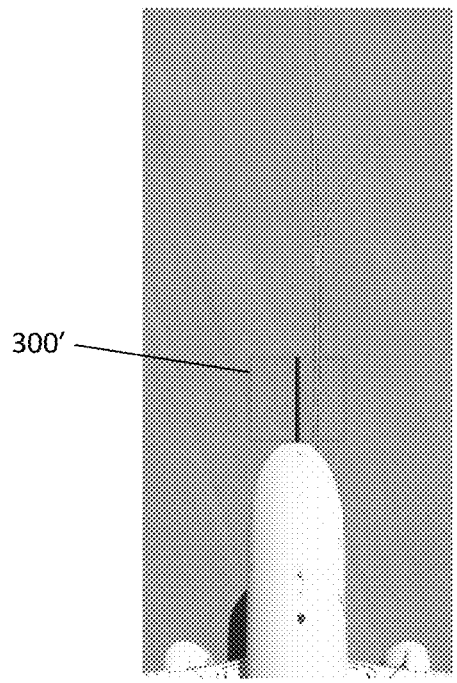
Figure 18B:
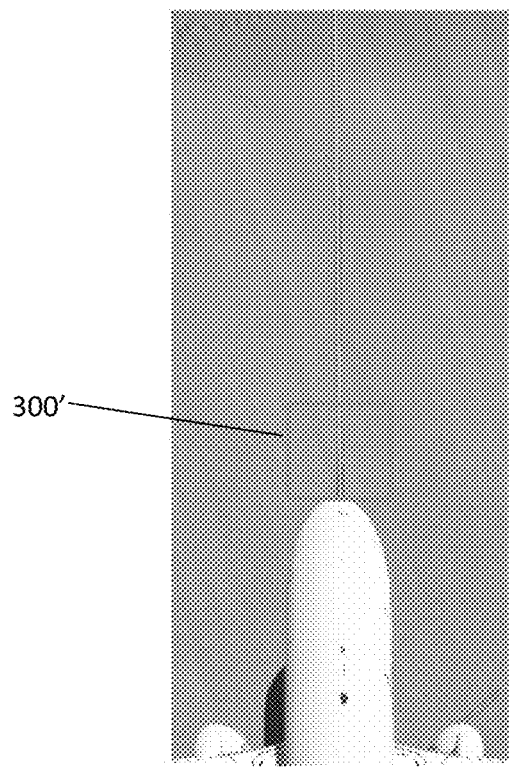
Figure 19A:
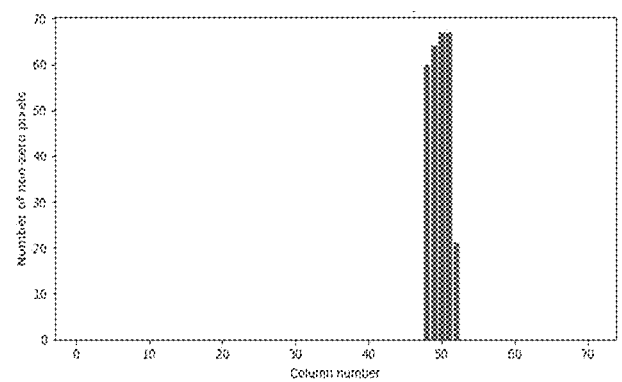
Figure 19B:
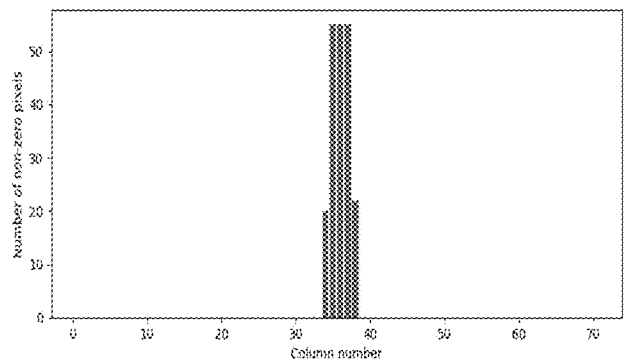
Figure 20:
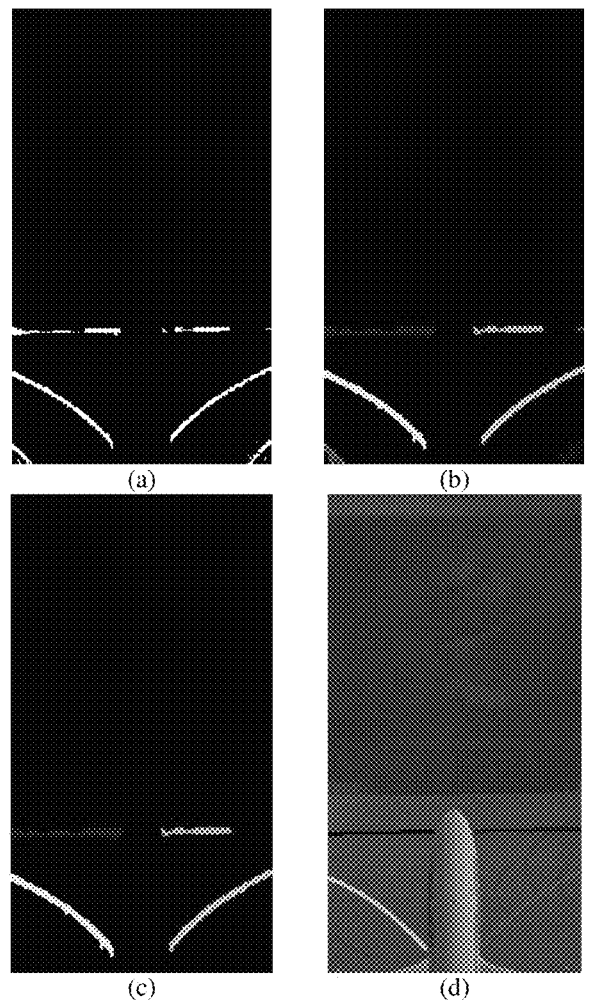
Figure 21:
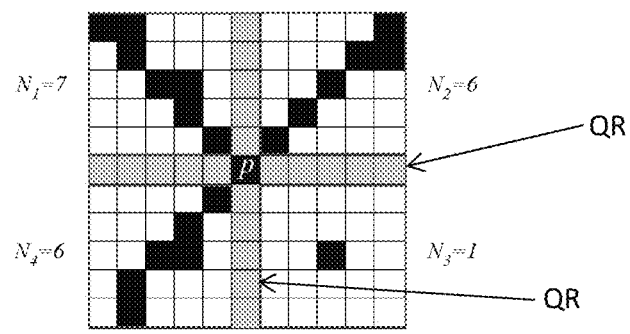
Figure 22:
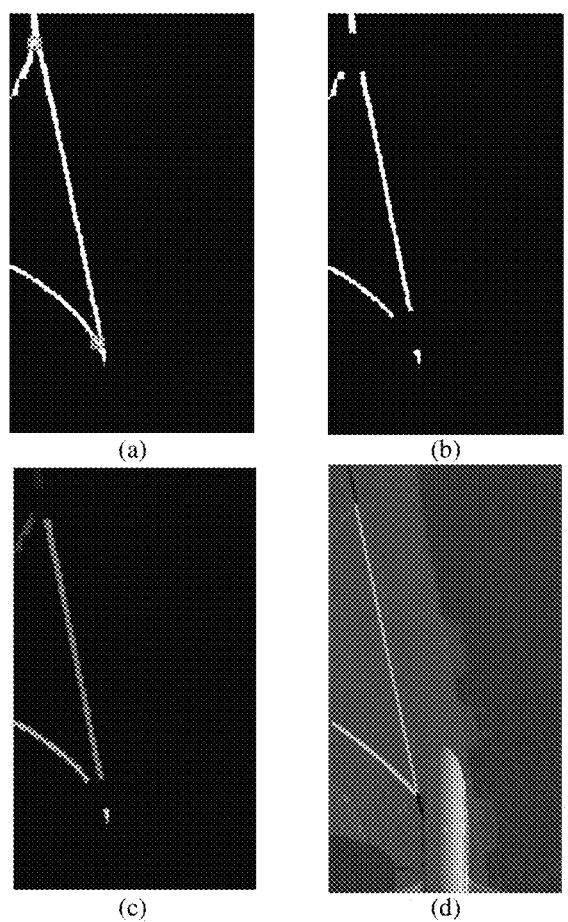
Figure 23:
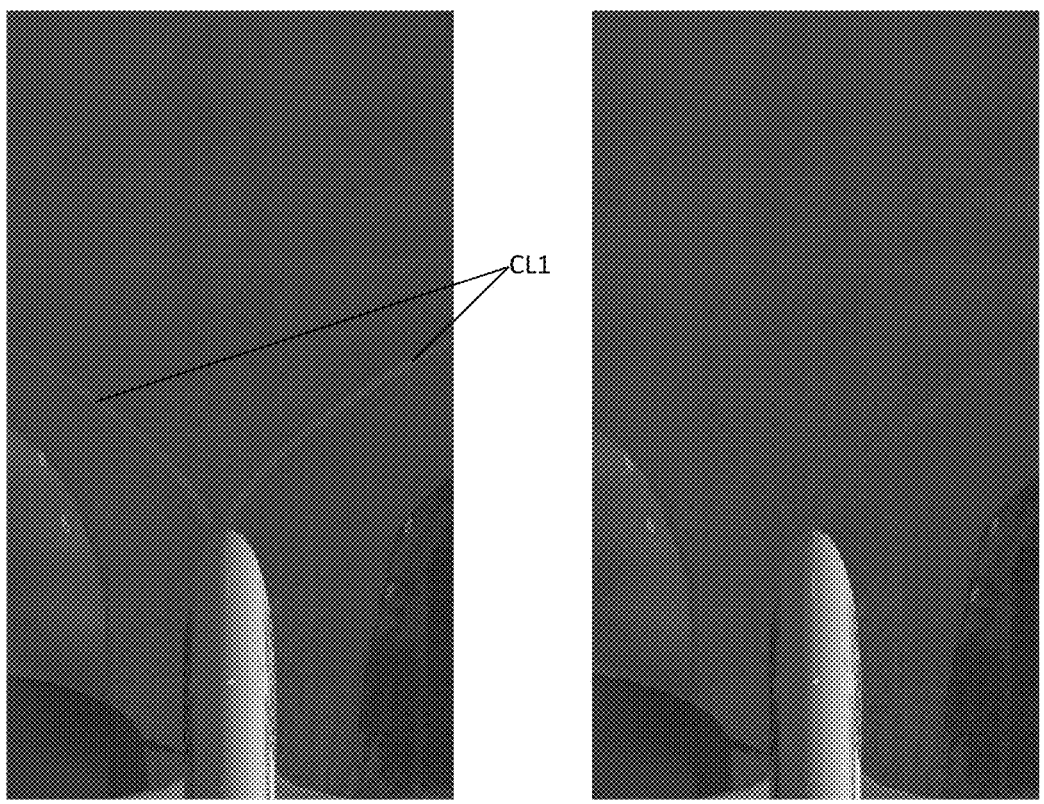
Figure 24:
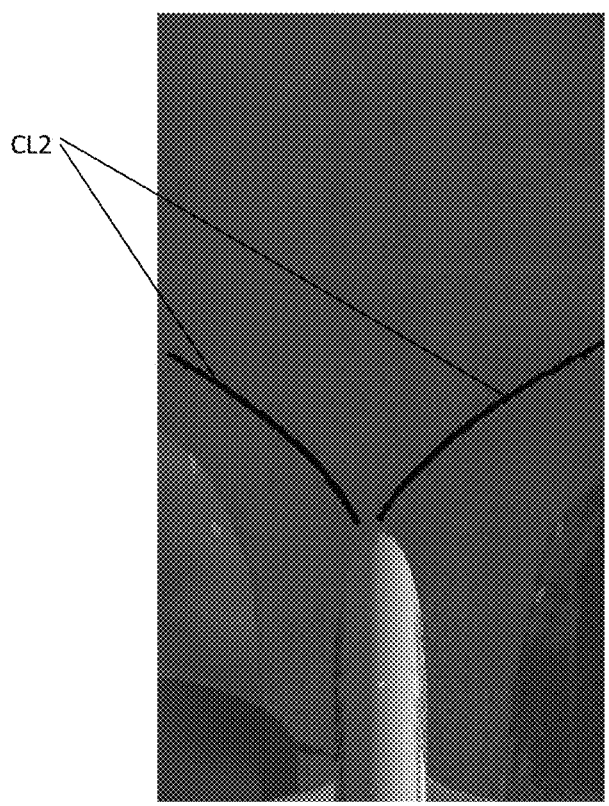

FIG. 14 is an image including a curve fitted to a detected taxiway branch;

FIG. 15 is a histogram corresponding to horizontal taxiway lines;

FIG. 16 is an image showing detected horizontal lines;

FIG. 17 is an image showing detected taxiway lines;

FIG. 18A is an image showing the region of interest when the aircraft is situated to the left of the taxiway centerline;

FIG. 18B is an image showing the region of interest when the aircraft is situated on the taxiway centerline;

FIG. 19A is a histogram corresponding to an aircraft shown in FIG. 18A;

FIG. 19B is a histogram corresponding to an aircraft on the taxiway centerline;

FIG. 20 is a series of images, parts (a) to (d), of the clustering method in accordance with embodiments of the disclosed subject matter;

FIG. 21 is a diagram showing the detection of a taxiway intersection;

FIG. 22 is a series of images, parts (a) to (d), of a clustering method with intersection detection in accordance with embodiments of the disclosed subject matter, as a binary image with detected intersections (a), binary image with intersections removed (b), detected clusters (c), fitted lines/curves on top-down camera view (d);

FIG. 23 is an image of curved taxiway centerlines detected in an image frame (left), and missing from the subsequent image frame (right); and, FIG. 24 is an image of curved taxiway centerlines being tracked.

DETAILED DESCRIPTION OF THE DRAWINGS

Before explaining at least one embodiment of the disclosure in detail, it is to be understood that the disclosure is not necessarily limited in its application to the details of construction and the arrangement of the components and/or methods set forth in the following description and/or illustrated in the drawings. The disclosed subject matter is capable of other embodiments or of being practiced or carried out in various ways.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more non-transitory computer readable (storage) medium(s) having computer readable program code embodied thereon.

Figures 1, 1A:
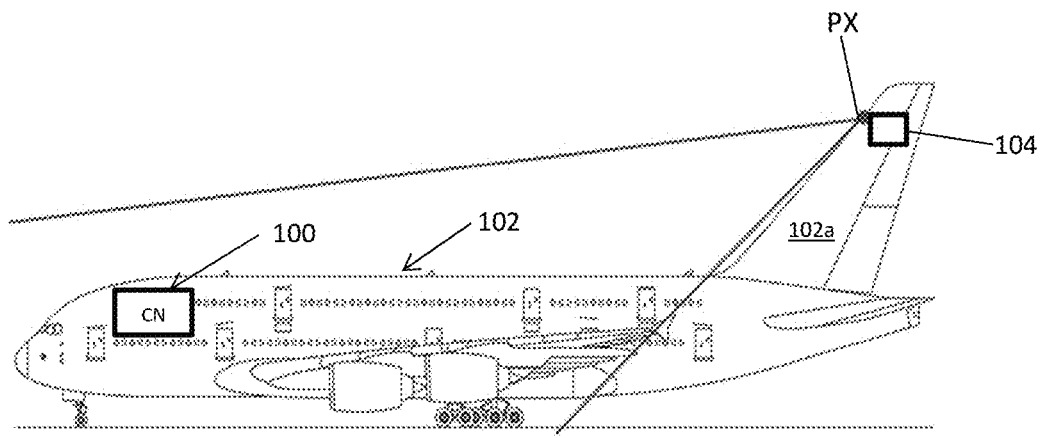
Figures 1, 1A, 2:
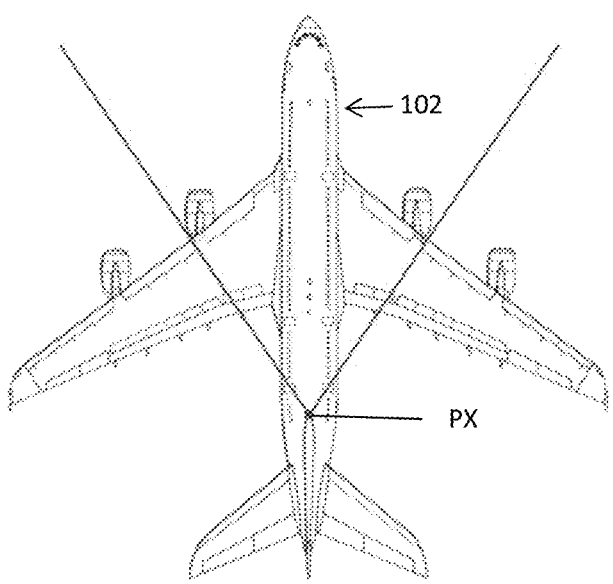

FIGS. 1A-1 and 1A-2 show an example environment for the disclosed subject matter. A control system or controller (CN) 100 is, for example, in an airplane or aircraft 102, for example, an airplane that will be and is taxiing. The controller 100 is linked to the camera 104, and to a cockpit display 106 (FIG. 1B) viewable by the pilot and other flight crew, over electronic and/or data connections. The display 106 is, for example, one of the existing displays in a glass cockpit (e.g., the Navigation Display or the System Display), and may be part of the flight management computer, flight management system, and the like. The display may also be a dedicated display, or a portable display, such as a laptop or tablet computer, brought into the cockpit. The camera 104 is, for example, an electro-optical (EO) camera, for taking, recording, and/or storing video, for example, as digital images (comprised of pixels), but can also take still images, and is mounted on the aircraft 102, for example, at or proximate to the vertical stabilizer, e.g., tail section 102a, of the aircraft 102. The camera 104 field of view is based on an imaging point PX of the camera 104, with the vertical field of view of the camera 104 is shown in FIG. 1A-1 and the horizontal field of view of the camera shown in FIG. 1A-2. "Linked" as used herein, includes both wired and/or wireless links, either direct or indirect, between components, such that the components are in electronic and/or data communications with each other, either directly or indirectly. The "links", as referred to herein, include, for example, wired communications, as well as wireless communications, such as WiFi®, Bluetooth®, and networked links, such as via a local area network (LAN) or wide area network (WAN), including public networks, such as the Internet.

Figure 1B:
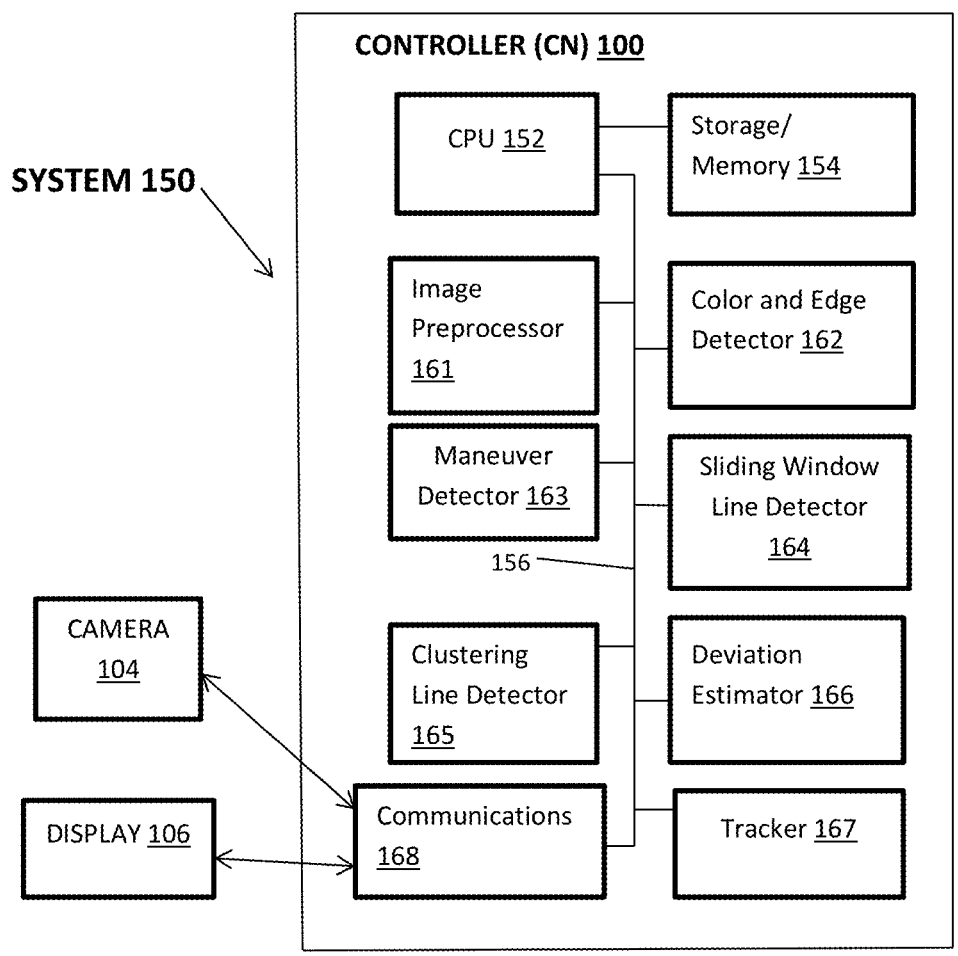
Figure 2:
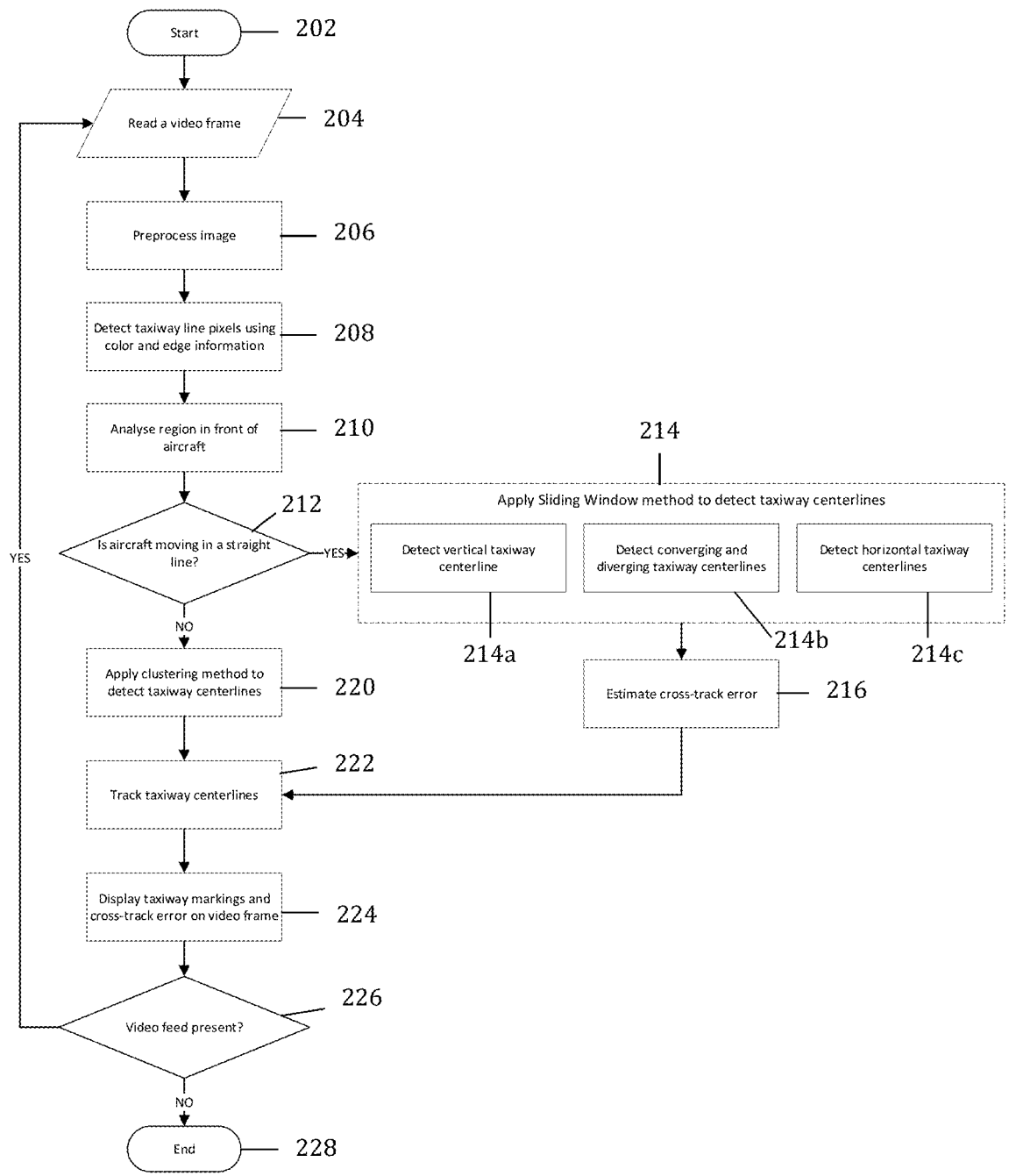

Turning also to FIG. 1B, there is shown the architecture of an example system 150, including the controller 100, as linked (shown by the double headed arrows) to the camera 104 and the display 106. The link between the controller 100 (communications module 168) and the camera 104 carries raw images, such as video streams, captured by the camera 104 and transmitted to the controller 100. The link between the controller 100 (communications module 168) and the display 106 represents the processed images/videos (video streams) with an overlay of the detected taxiway lines and cross-track error. The system 150 includes the control system 100, for example, a computer for performing the control operations for taxiing of the airplane 102, both from a gate to the runway, from the runway to the gate, as well as other maneuvers associated with moving the airplane 102.

The controller 100 includes one or more processors, for example, a central processing unit (CPU) 152, linked to storage/memory 154. The CPU 152 is linked, either directly or indirectly to various modules 161-168, for example along a bus 156. The modules include, for example, an image preprocessor or image preprocessing module 161, a color and edge detector or color and edge detecting module 162, a maneuver detector or maneuver detection module 163, a sliding window line detector or sliding window line detection module 164, a clustering line detector or clustering line detection module 165, a deviation estimator or deviation estimation module 166, and a tracker or tracking module 167. There is also a communications interface 168 for processing communications, transmissions to and from the controller 100, and the like. As used herein, a "module", for example, includes a component for storing instructions (e.g., machine readable instructions) for performing a process, and including or associated with processors for executing the instructions. All of the components 152, 154 and 161-168, link to each other either directly or indirectly for electronic and/or data communication therebetween. The controller 100 is, for example, on a single computer, but may be distributed over multiple, computers, servers, machines and the like.

The CPU 152 performs the processes (methods) of the disclosed subject matter. For example, the processors may include x86 Processors from AMD and Intel, Xenon® and Pentium® processors from Intel, as well as any combinations thereof. Additional processors, including hardware processors, storage/memory, modules and storage media may also be part of the system for performing the disclosed subject matter.

The storage/memory 154 stores machine-executable instructions executed by the CPU 152 for performing the disclosed processes, as detailed and shown in FIG. 2, for example, which when programmed accordingly into the CPU 152, control the camera 104, display 106, storage/memory media 154 and the modules 161-168. The storage/memory 154, for example, also provides temporary storage for the controller 100.

Figure 3:
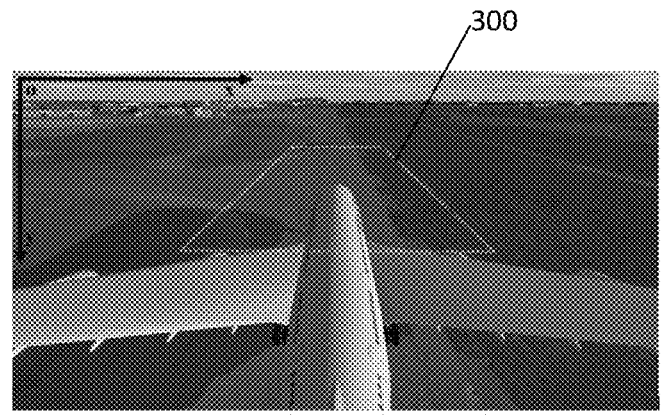

The image preprocessor or image preprocessing module 161 provides image preprocessing and processing and is programmed to perform, for example, the selection of region(s) of interest (ROI) 300 (FIG. 3) for the aircraft 102 and Homographic Transforms (discussed in detail below).

The color and edge detector or color and edge detecting module 162 functions to detect image pixels which potentially belong to taxiway line markings, by exploiting the typical color and edge characteristics of taxiway lines.

The maneuver detector or maneuver detection module 163 functions to identify whether the aircraft is moving in a straight line or performing a turn maneuver.

The sliding window (SW) line detector or sliding window line detection module 164 functions to detect taxiway line markings by using a sliding window technique.

The clustering line detector or clustering line detection module 165 functions to detect taxiway line markings by using a clustering technique.

The deviation estimator, or deviation estimation module 166 functions to estimate the horizontal distance, also known as "cross-track error", between the longitudinal axis of an aircraft (i.e., the line passing through the nose and tail of the aircraft 102) and the taxiway centerline.

The tracker or tracking module 167 functions to track the taxiway line markings (which are detected by the SW line detector 164 and clustering line detector 165) in consecutive image frames. This improves the overall detection rate of the overall system 150.

The communications interface or module 168 functions to provide wired and wireless electronic and/or data communications (e.g., over on-line links) between the controller 100 and the camera 104, and the controller 100 and the display 106, as well as other destinations over various networks.

Attention is now directed to FIG. 2, which shows a flow diagram detailing a computer-implemented process and sub-processes in accordance with embodiments of the disclosed subject matter. Reference is also made to elements shown in FIGS. 1A-1, 1A-2, and 1B. The aforementioned processes and sub-processes are, for example, performed automatically and in real time.

The process begins at a START block 202, where the camera 104 captures and records one or more images, for example, a plurality of images as a video stream. The images of the video stream are, for example, digital images, formed of pixels, in successive frames, and obtained, for example, continuously and automatically. The camera 104 transmits this recorded video stream to the controller 100, for processing by the image preprocessor 161. The process moves to block 204, where the image preprocessor 161, beginning with a first or input frame from the video stream, reads each video frame.

Figure 4:

The process moves to block 206, where each read digital image, formed of pixels, is preprocessed. The preprocessing includes, for example, selecting a Region of Interest (ROI) 300 (e.g., the area lateral to and in front of the aircraft, as shown in broken lines, in FIG. 3), from each input frame in order to discard the horizon and other unnecessary parts of the image. Additionally, the ROI 300 is transformed to a top-down view (e.g., an inverse perspective view) of the same input frame, for example, by the preprocessing operation including performing a Homographic Transform, the result of which is shown in FIG. 4.

The top-down view of the input image is generated, for example, to remove perspective effects which cause the apparent size of taxiway markings to decrease with distance from the camera. Thus, each pixel in the top-down view (FIG. 4) represents an equal area of the taxiway, and parallel line markings on the taxiway also appear parallel in the top-down view. This simplifies the subsequent steps of the process. The transformation to the top-down view is a Homographic Transform, for example, as disclosed in, A. Criminisi, et al., "A Plane Measuring Device," in, *Imaging and Vision Computing*, Vol. 17, Issue 8, pp. 625-634 (1999), this document incorporated by reference herein. This Homographic transform relates a point in the input image to a point in the top-down view as follows in Equation 1:

$$\begin{bmatrix} -x_1 & -y_1 & 1 & 0 & 0 & 0 & x_1X_1 & y_1X_1 \\ 0 & 0 & 0 & -x_1 & -y_1 & -1 & x_1Y_1 & y_1Y_1 \\ -x_2 & -y_2 & -1 & 0 & 0 & 0 & x_2X_2 & y_2X_2 \\ 0 & 0 & 0 & -x_2 & -y_2 & -1 & x_2Y_2 & y_2Y_2 \\ \vdots & \vdots & \vdots & \vdots & \vdots & \vdots & \vdots & \vdots \\ 0 & 0 & 0 & -x_n & -y_n & -1 & x_nY_n & y_nY_n \end{bmatrix} \begin{bmatrix} h_1 \\ h_2 \\ h_3 \\ h_4 \\ h_5 \\ h_6 \\ h_7 \\ h_8 \\ h_9 \end{bmatrix} = \begin{bmatrix} X_1 \\ Y_1 \\ X_2 \\ Y_2 \\ \vdots \\ Y_n \end{bmatrix} \quad (1)$$

where $(x_1, y_1), \ldots, (x_n, y_n)$ are image plane coordinates, $(X_1, Y_1), \ldots, (X_n, Y_n)$ are the corresponding ground plane (top-down view) coordinates and $h_1, \ldots, h_9$ are the elements of a 9×1 Homography matrix. The elements of this matrix are found using a calibration process, where the coordinates of at least four pairs of corresponding points (between the ground plane and the image plane) are known. Each pair of corresponding points corresponds to the same physical (3D) location.

The process moves to block 208, where taxiway line pixels are detected using color and edge information, from the color and edge detector 162. Here, color and edge detection techniques are applied to the top-down view (FIG. 4), for example, in the ROI 300 (of the digital image), to detect pixels corresponding to taxiway lines.

Figure 5:
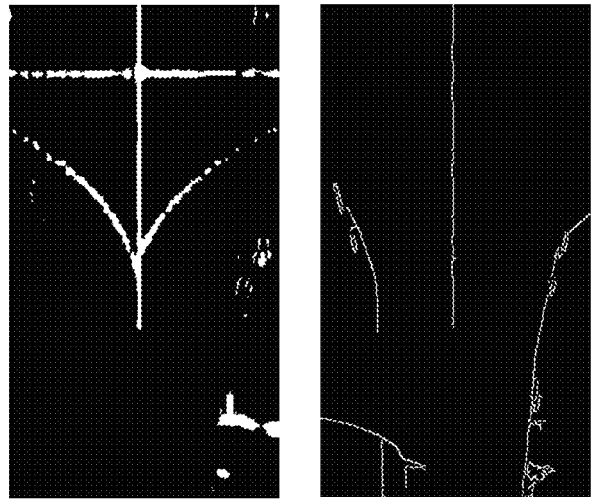

For detecting taxiway lines based on the color of the taxiway lines, the top-down digital image (such as that shown in FIG. 4) is analyzed based on Hue, Saturation, Value (HSV), to determine whether the color of each pixel in the top-down digital image matches a range of predetermined colors, and generating a binary image (also known as a first binary image) based on pixels matching the range of predetermined colors. For example, taxiway lines are typically painted yellow and, as such, the CPU 152 processes the top-down view, and generates a binary image (with the same size as the top-down view). In the binary image (e.g., first binary image) created from the taxiway line color analysis, a pixel in the binary image is assigned a value of 1 if the corresponding pixel in the top-down view is yellow, for example, by the pixel matching a range of predetermined colors associated with taxiway lines, such as yellow, and 0 otherwise. A HSV (Hue, Saturation, Value) representation was determined for yellow color pixels, considered to be yellow if their HSV values lie in the range given by H= {15 . . . 35}, S={40 . . . 255}, V={50 . . . 255}. FIG. 5 shows an example of a binary image, with color detection in the left side image.

Edge detection is performed, for example, on the top-down digital image, such as that of FIG. 4, using a Canny Edge Detector, to determine whether each pixel of the digital image defines an edge of at least one of the taxiway lines, and generating a second binary image of the pixels which define the edges of the at least one of the taxiway lines. The Canny Edge Detector is a robust edge detector which comprises a number of steps, such as: noise reduction by means of a Gaussian filter; computation of intensity gradients; non-maximum suppression (to remove false detections); thresholding; and edge tracking by hysteresis. The output of the Canny edge detector is a binary image, also known as a second binary image. FIG. 5 shows an example of a binary image with edge detection in the right side image.

Figure 6:
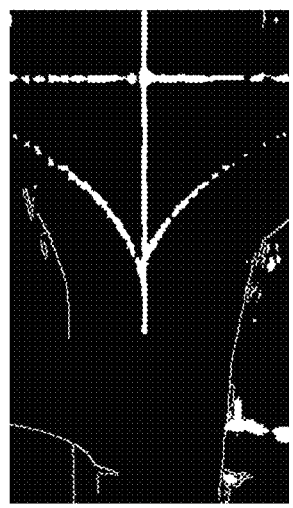

For example, the color and edge detection analysis is performed and complete, as a bitwise OR operation is carried out on the binary images that are output by the color detection and edge detection (the subprocess of block 208). This results in a single or combined binary image, shown, for example, in FIG. 6, which combines the taxiway line pixels detected with the two methods, e.g., the color detection image (as a binary image) and the edge detection image (as a binary image) of FIG. 5. By combining color and edge detection binary images (FIG. 5, left and right, respectively), as shown by the image of FIG. 6, a combined binary image, a more robust detection of taxiway lines is achieved. A combined binary image, for example, such as that of FIG. 6 (or in accordance therewith, or similar thereto), is the "binary image" referred to in the blocks following block 208, except where indicated.

Following edge and color detection, the process moves to block 210, where a region in the front of the aircraft, within the combined binary image of FIG. 6, is analyzed. This subprocess is performed by the maneuver detector 163, which checks for the presence of a taxiway centerline in a square search region (e.g., 15×15 pixels) directly in front of the nose of the aircraft 102.

Figure 7:
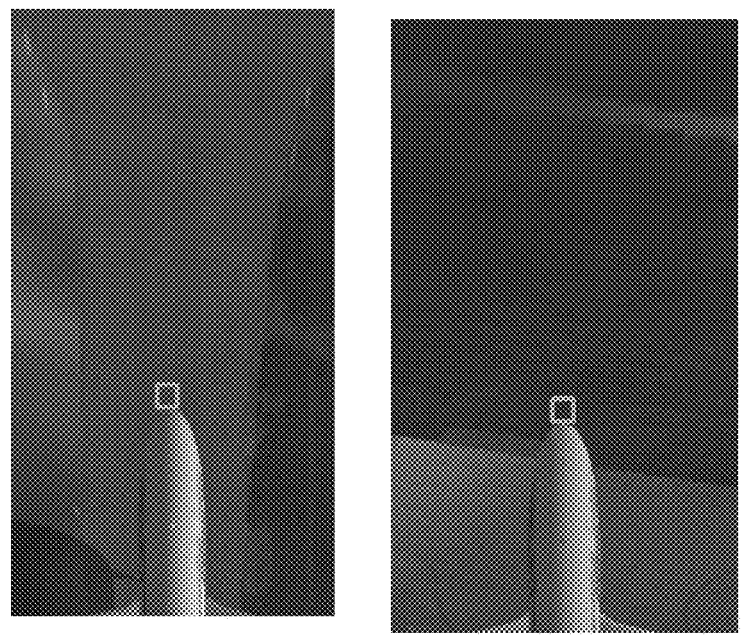

Moving to block 212, the maneuver detector 163 determines the type of taxi maneuver being performed, such as taxiing, in a straight line, close or proximate to the taxiway centerline as marked on the tarmac of the taxiway or turning, such as when turning 90 degrees on a different taxiway. For example, when a commercial passenger aircraft is taxiing in a straight line (i.e., close to or on the taxiway centerline), the taxiway centerline will be situated ahead of the nose of the aircraft 102. Alternately, if the aircraft 102 is turning, the taxiway centerline will be either to the left and/or to the right of the aircraft's 102 nose. This may occur because, in order for the main landing gear to remain in the middle of the taxiway during a turn, the nose wheel of the aircraft 102 follows a slightly different trajectory than the taxiway centerline. Thus, in order to determine whether the aircraft 102 is turning or moving in a straight line, the maneuver detector 163 checks for the presence of a taxiway centerline in a square search region (e.g., 15×15 pixels) directly in front of the aircraft's 102 nose. If a taxiway line is detected in this region, it is assumed that the aircraft 102 is moving in a straight line; otherwise, it is assumed that the aircraft is in a turn, as shown, for example, in FIG. 7. In FIG. 7, the left picture shows the aircraft moving in a straight line, while the right picture shows the aircraft performing a 90 degree turn maneuver.

At block 212, should the aircraft 102 be moving in a straight line, the process moves to block 214. At block 214 a sliding window process is performed by the sliding window (SW) line detector 164, to detect the taxiway centerline. This sliding window process of block 214 is shown by sub blocks 214a, 214b, and 214c, in that order.

At block 214, taxiway centerlines, including the centerline directly ahead of the airplane 102 and the centerlines of any intersecting taxiways are detected, for example, by the SW line detector 164. Should the aircraft 102 be assumed to be moving in a straight line (or a substantially straight line), the detector 164 will proceed to detect taxiway lines in the current frame (e.g., of a subsequent digital image) using a Sliding Window (SW) technique. The SW technique uses a 'window' which is shifted over an image to detect information (data), for example, information indicative of one or more taxiway lines, within a region corresponding to the window's position. For example, a SW may be of size 30×30 pixels. The SW technique, for example, is such that if the movement of the aircraft is at least in a substantially straight line along the taxiway, a plurality of windows in succession in the subsequent digital image is generated, in order to detect at least one taxiway line of the one or more taxiway lines for the aircraft to follow, each window of at least a predetermined number of pixels (e.g., 30×30 pixels), and, the succession of each of the windows including positioning a successive window after a previous window to advance each successive window in a direction corresponding to at least one of the taxiway lines detected in the previous window, the at least one of the taxiway lines being detected based on analyzing the pixels in the previous window.

The analysis detects taxiway lines, e.g., taxiway centerlines, by detecting vertical lines (block 214a), diverging or converging lines, including intersection lines, defining taxiway junctions (block 214b), and horizontal lines (block 214c).

Figure 8:
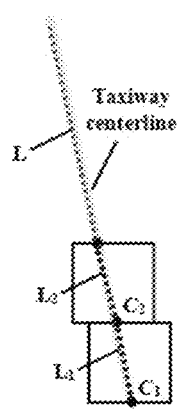

At block 214a, the taxiway centerline, as one or more vertical taxiway lines is/are determined and detected by fitting a line to the non-zero pixels in the windows of the successive "sliding windows". It is assumed that the aircraft 102 is initially aligned with the taxiway centerline. Thus, the SW is first positioned over the combined binary image, which was the output of block 208, such that the bottom center $C_1$ of the window coincides with the nose of the aircraft 102. Then, pixels corresponding to the taxiway centerline are detected within the SW and a straight line $L_1$ is fitted through them using a least squares curve fitting method. The point $C_2$ where $L_1$ intersects the top of the SW marks the bottom center of the next position of the SW, as shown in FIG. 8. The SW is then shifted to $C_2$ and the process is repeated until the image boundary is reached. Finally, a line of best fit L is found, which extends through the lines ($L_1$, $L_2$, etc.), which are fitted at each position of the SW, as shown in FIG. 8. This subprocess, for vertical taxiway lines, may be used in an optional process of modeling at least one of the taxiway lines.

Figure 9:
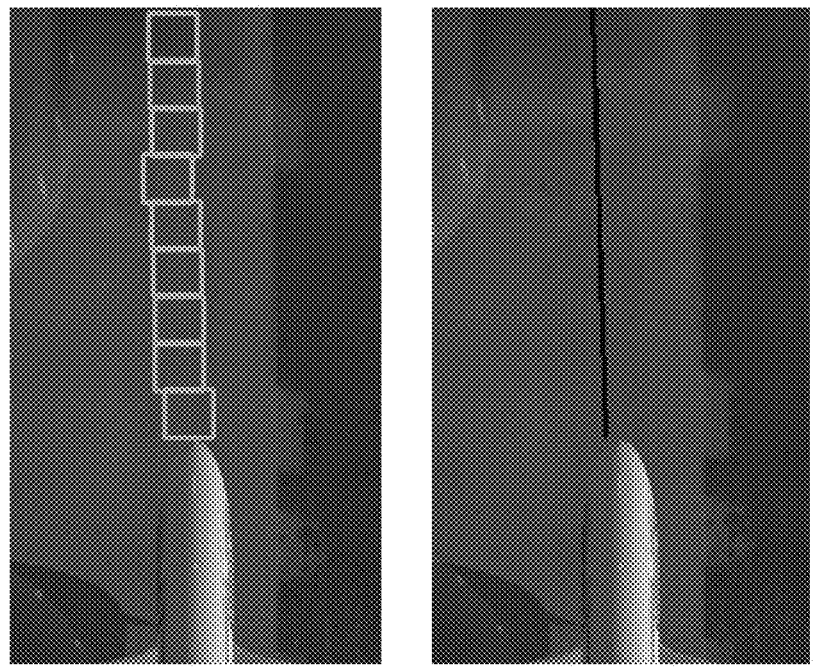

FIG. 9 shows the sliding windows for a particular frame (in the left image) and the detected taxiway centerline marked in black (in the right image).

Moving to block 214b, any diverging and/or converging taxiway lines, including taxiway centerlines are detected by the module 164. The detecting is performed by: computing a histogram of non-zero pixels in each column of the window; determining the number of converging or diverging taxiway lines by determining the number of gaps in the histogram; and, creating a window corresponding to each of the gaps, and fitting a line to the non-zero pixels in each of the created windows. For example, as shown in FIG. 10, diverging taxiway centerlines are shown in the left image, and converging centerlines are shown in the right image.

In order to detect taxiway lines, which are diverging to, or converging from, the taxiway centerline, for example, a histogram of non-zero pixels in each column of the SW is computed. The histogram is shown in FIG. 11. The histogram is initially processed to remove any bins where the sum of non-zero pixels is less than a pre-defined threshold. Then or second, the number of gaps (if any) in the processed histogram is assumed to correspond to the number of branches, in the taxiway. For example, the histogram of FIG. 11 contains two gaps corresponding to two branching taxiways.

Should one or more branching taxiways be detected, a SW is created corresponding to each gap in the histogram. For instance, in the example image shown in FIG. 12, two SWs are created by offsetting the original SW to the left and right by 15 pixels. Then, a second degree polynomial (i.e., a quadratic curve) is fitted through the pixels of each SW which correspond to taxiway lines. Next, the slope of the line joining the end points of the curve is found for each SW. The slope m of each of the lines is used to differentiate between converging and diverging taxiways, as defined in Table 1, as follows:

TABLE 1

Detection of converging and diverging taxiway centerlines

| Position of curved taxiway centerline | Slope | Inference |
|---|---|---|
| Left | m < 0 | Converging |
|  | m > 0 | Diverging |
| Right | m < 0 | Diverging |
|  | m > 0 | Converging |

FIG. 13 shows a graphical representation of the slopes corresponding to converging and diverging taxiway centerlines.

In the case of diverging taxiways, the next position of the SW (for each branch) is chosen such that the mid-point of the lower edge of the SW coincides with the top point of the fitted curve. Then, in order to be able to follow the curvature of the taxiway lines, the SW is rotated about its center by an angle θ which is equal to the angle between the line $L_a$ joining the end points of the fitted curve, and the line $L_b$ joining the midpoints of the top and bottom edges of the SW (before rotation). The angle θ is given by Equation 2 as follows:

$$\theta = \tan^{-1}\left|\frac{m_a - m_b}{1 + m_a m_b}\right| \quad (2)$$

where, $m_a$ and $m_b$ are the slopes of $L_a$ and $L_b$ respectively.

Once the SW is rotated, a curve is fitted to the non-zero pixels within the resulting window. The next position and orientation of the SW is determined as explained above and the process is repeated until the boundary of the image is reached. A single curve (one for each branch) is then fitted which goes through all of the non-zero pixels detected along the branch, as shown, for example, in FIG. 14. This subprocess, for converging and/or diverging taxiway lines, may be used in the optional process of modeling at least one of the taxiway lines.

Moving to block 214c, the detection of horizontal taxiway centerlines is performed, for example, by computing a histogram of non-zero pixels in each row of the sliding windows (or each row of the windows), and analyzing the peaks of the histogram; which is followed by creating a window in the direction of each horizontal taxiway line, and fitting a line to the non-zero pixels in each of the created windows. As with the case of converging or diverging taxiway centerlines, the SW is first positioned over the combined binary image, the output of block 208, such that the bottom center of the window coincides with the nose of the aircraft 102. In order to detect a horizontal taxiway line in the binary image, a histogram of non-zero pixels in each row of the SW is computed in FIG. 15, which shows the histogram obtained when two horizontal taxiway lines (to the left and to the right of the centerline) are contained in the SW. This histogram is characterized by a single peak corresponding to the horizontal taxiway lines. The module 164 processes the histogram by calculating the absolute difference in the number of non-zero pixels between adjacent bins (rows). Then, it determines the maximum absolute difference $d_{max}$. If $d_{max}$ corresponds to the first or last bins of the histogram, or if it occurs multiple times over the same histogram, the algorithm will discard the histogram. Otherwise, $d_{max}$ is compared to a predefined threshold T and, if $d_{max}$>T, a horizontal line is detected. The threshold T aids in removing any erroneously detected horizontal lines.

If a horizontal line is detected, the next step is to detect the remainder of the horizontal line. This is performed by creating a SW in the direction of each horizontal line as shown in FIG. 16. A curve is then fitted through the non-zero pixels in the left SW and another curve is fitted through the non-zero pixels in the right SW using a least squares curve fitting method. Next, the left and right SWs are shifted horizontally outwards by 30 pixels (i.e., the width of the SW) and curve fitting is performed at the new SW positions. This process is repeated until the boundary of the image is reached. Finally, a single curve is fitted through all of the non-zero pixels detected by this process as shown in FIG. 16 (as marked by horizontal lines HZ). This subprocess, for horizontal taxiway lines, may be used in the optional process of modeling at least one of the taxiway lines. FIG. 17 shows an image with all of the curves fitted to the taxiway lines detected using the SW method.

The process now moves to block 216, where an estimation of the deviation from the taxiway centerline, also known as the "cross-track error", is performed, for example, by the deviation estimator 166. The centerline deviation or cross-track error is estimated using a template matching approach, similar, for example, to that of D. A. Pomerleau, "*RALPH: Rapidly Adopting Lateral Position Handler,*" in, *Proceedings of the Intelligent Vehicles '95. Symposium,* pp. 506-511, 1995, Available: doi: 10.1109/IVS.1995.528333, this document incorporated by reference herein. In each frame, a histogram H of the number of non-zero pixels in each column of a small region of interest (e.g., 70×70 pixels) directly in front of the nose of the aircraft 102 is found.

FIG. 18A shows the region of interest (ROI) 300' when the aircraft 102 is situated to the left of the taxiway centerline. FIG. 18B shows the region of interest (ROI) 300' when the aircraft 102 is exactly on the taxiway centerline. FIG. 19A is a histogram H representing when the aircraft 102 is situated 15 pixels to the left of the taxiway centerline.

This is compared with a histogram template $H_T$, of FIG. 19B, representing when the aircraft 102 is exactly on the taxiway centerline. $H_T$ is shifted in steps of 1 bin (where 1 bin corresponds to 1 pixel) and the correlation between H and $H_T$ is determined at each step. The deviation of the aircraft 102 from the centerline is given by the value of the shift which maximizes the correlation between the two histograms. The deviation in pixels can be expressed as a physical distance (e.g., centimeters (or meters)) using a scaling factor.

From block 216, the process moves to block 222, from where the process continues.

Returning to block 212, should the aircraft not be moving in a straight line, for example, turning, the process moves to block 220, where a clustering technique is applied to detect taxiway centerlines, by the clustering line detector 165. For example, the clustering line detector 165 uses clustering methods to detect taxiway centerlines. The clustering method, process, or technique, for example, determines and/or detects taxiway lines, which are separate from each other, and/or, determines or detects taxiway lines by separating intersecting taxiway lines from each other.

If the aircraft 102 is assumed to be turning, the clustering line detector 165 proceeds to detect taxiway lines in the current frame using a clustering technique. The clustering technique or process employs the Density-Based Spatial Clustering of Applications with Noise (DBSCAN) technique or process, for example, as disclosed in M. Ester, et al., "A Density Based Algorithm for Discovering Clusters in Large Spatial Databases with Noise," in, *KDD '96 Proceedings of the Second International Conference on Knowledge Discovery and Data Mining,* pp. 226-231 (August 1996), this document incorporated by reference herein, was applied. This method is used, for example, as it: (a) is robust to outliers, (b) does not require the number of clusters to be defined beforehand, and (c) can identify arbitrary-shaped clusters. The DBSCAN input parameters (distance threshold ε and the minimum number of points minPts) may be set, for example, to 0.123 and 2 pixels respectively.

FIG. 20, at part (a), shows a binary image which is input to the DBSCAN algorithm, while FIG. 20, at part (b), shows the detected clusters (where each cluster is represented by a different color). First, a filtering step is carried out where small clusters (assumed to be due to noise) are removed (FIG. 20 at part (c)). Then, a straight line and a quadratic curve are fit to each cluster individually, and the model which gives the least squares error (i.e. either the line or the curve) is selected as the best fit for each cluster. The fitted lines/curves are superimposed on the top-down camera view, as shown in FIG. 20 at part (d).

The method described above is optimal when each taxiway line is separate from any other taxiway centerlines in the image. This is because, in this case, each taxiway centerline is detected as a separate cluster and the line/curve of best fit models the taxiway line correctly. However, if two (or more) taxiway centerlines intersect, they are likely to be detected as a single cluster and will not be modeled correctly by a single line/curve. Therefore, it is necessary to detect any taxiway intersections in the binary image before applying DBSCAN.

Another method, process, or technique is used to determine or detect taxiway lines by separating intersecting taxiway lines also known as intersections. The taxiway lines of the intersections are detected, for example, by separating intersecting taxiway lines from each other including: detecting intersections of taxiway lines from the combined binary image, modifying the combined binary image including removing the non-zero pixels from the detected intersections of taxiway lines in the combined binary image; and, applying a DBSCAN process (detailed above) to the modified combined binary image. The taxiway line intersections are detected, for example, by processing the combined binary image by analyzing a region of at least a predetermined number of pixels centered at each non-zero pixel (in the combined binary image), and, determining whether the number of non-zero pixels in the region exceeds a certain threshold number.

For example, taxiway line intersections are detected and/or determined by analyzing a square region (e.g., 11×11 pixels) centered at each non-zero pixel p in the combined binary image, and checking if the number of non-zero pixels $N_i$ (i=1 . . . 4) in each quadrant exceeds a certain threshold t. If $N_i$>t for at least three of the quadrants, then it is assumed that a junction is present around p. This is illustrated in FIG. 21. Note that the pixels in the grey region (QR) of FIG. 21 are not considered in the calculation because they do not belong to any particular quadrant.

Once the binary image is processed to detect taxiway line intersections (FIG. 22 at part (a)), a circular region (e.g., with a radius of 23 pixels) is defined at the center of each intersection and any non-zero pixels within the circular region are removed. This effectively separates any intersecting taxiways in the binary image (FIG. 22 at part (b)) such that they can be detected as individual clusters. The binary image is then processed by DBSCAN (FIG. 22 at part (c)). Finally, a line or curve is fitted to each cluster (as described previously) and the lines/curves are extrapolated to the associated taxiway intersections and superimposed on the top-down camera view (FIG. 22 at part (d)). This subprocess, for clustering, may be used in the optional process of modeling at least one of the taxiway lines.

The aforementioned the optional process of modeling at least one of the taxiway lines, of block 214 and/or block 220, is performed, for example, by fitting at least one of: a line, or a curve, through each group of non-zero pixels corresponding to a taxiway line in the combined binary image of a subsequent digital image, prior to the tracking the one or more detected taxiway lines.

The process moves from block 220 to block 222, and also from block 216 to block 222, where taxiway centerlines (which were detected previously) are tracked. The tracking is performed by the tracker or tracking module 167.

As explained above, the outputs of blocks 220 and 216 for a frame N are the lines/curves of best fit through each of the detected taxiway centerlines (as shown, for example, in FIG. 17). Using the equations of these lines/curves, the x and y coordinates of a number of points on each line/curve in frame N are obtained, and each point is tracked individually using a Linear Kalman Filter. In this way, if certain taxiway centerlines are not detected in the next frame N+1 (i.e. there is no measurement), their new position in frame N+1 can be predicted based on their previous position in frame N. In this case, the undetected taxiway centerlines are labeled 'missing'.

If a particular taxiway centerline goes missing for more than, for example, five consecutive frames, then it is no longer tracked by module 167 and the centerline is assumed to be outside the field of view of the camera 104.

FIG. 23 shows an example where the curved taxiway centerlines are detected in a frame N (and marked CL1) but are not detected in frame N+1. However, using a Kalman filter, the curved lines are tracked from frame N to N+1 and their position in frame N+1 is predicted by the filter (and marked as CL2, in FIG. 24). This improves the overall detection rate of the complete system 150.

From block 222, the process move to block 224, where, for example, taxiway markings and cross-track errors are displayed on the requisite video frame(s), and presented on the pilot and/or flight crew's screen display. The process moves to block 226, where the controller 100, via the communications module 168, determines whether a video feed is present. For example, a video feed includes a sequence of images coming from the camera 104 at a certain frame rate. If yes, the process moves to block 204, from where it continues. If no at block 226, the process moves to block 228, where the process ends.

As one cycle has been shown for the process in blocks 202-228, the cycle may be repeated for as long as desired. The process may be performed temporarily or on a continuous basis. For example, the process may be triggered manually by the pilot, or automatically (e.g., whenever the system detects that the aircraft is taxiing). The process may also be disabled manually by the pilot or automatically (e.g., whenever the system detects that the aircraft is on the runway and/or its speed is above a certain predetermined threshold).

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present disclosure. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present disclosed subject matter. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosed subject matter have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosed subject matter. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the disclosed subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for detecting taxiway lines in an aerodrome, comprising:
   obtaining digital images of an aircraft indicative of the forward direction of movement of the aircraft;
   detecting pixels corresponding to taxiway lines in a digital image of the obtained digital images including: 1) determining whether there are pixels matching a range of predetermined colors associated with taxiway lines, and, 2) determining whether there are pixels defining an edge of a taxiway line;
   in a subsequent digital image of the obtained digital images, determining whether the movement of the aircraft is at least in a substantially straight line by analyzing at least a portion of the subsequent digital image corresponding to a region in front of the aircraft wherein:
   a) if the movement of the aircraft is at least in a substantially straight line along the taxiway, detecting one or more taxiway lines within the subsequent digital image comprising: generating a plurality of windows in succession in the subsequent digital image, to detect at least one taxiway line of the one or more taxiway lines for the aircraft to follow, each window of at least a predetermined number of pixels, and, the succession of each of the windows including positioning a successive window after a previous window to advance each successive window in a direction corresponding to at least one of the taxiway lines detected in the previous window, the at least one of the taxiway lines being detected based on analyzing the pixels in the previous window; or,
   b) if the movement of the aircraft is not at least in a substantially straight line, including turning movements of the aircraft along the taxiway, detecting one or more taxiway lines within the subsequent digital image comprising: applying at least one clustering process to the pixels of the subsequent at least one digital image to detect the one or more taxiway lines; and, tracking the one or more detected taxiway lines, as coordinated with the movement of the aircraft, by analyzing multiple successive frames of the obtained digital images in the successive order of the frames until the one or more taxiway lines are no longer detected in a predetermined number of consecutive frames.

2. The method of claim 1, wherein the obtaining the digital images is performed continuously and automatically.

3. The method of claim 1, additionally comprising: obtaining a region of interest (ROI) within a digital image and converting the region of interest to a top-down digital image.

4. The method of claim 3, wherein the converting includes performing a Homographic Transform on the digital image.

5. The method of claim 3, additionally comprising: analyzing the top-down digital image based on Hue, Saturation, Value (HSV), to determine whether the color of each pixel in the top-down digital image matches a range of predetermined colors, and generating a first binary image based on pixels matching the range of predetermined colors.

6. The method of claim 5, additionally comprising: analyzing the top-down digital image by performing a Canny edge detection process, to determine whether each pixel defines an edge of at least one of the taxiway lines, and generating a second binary image of the pixels which define the edges of the at least one of the taxiway lines.

7. The method of claim 6, additionally comprising: creating a combined binary image from the first binary image and the second binary image.

8. The method of claim 7, wherein the analyzing the pixels in the previous window includes at least one of:
   a) determining vertical taxiway lines by fitting a line to the non-zero pixels in the window;
   b) determining converging and/or diverging taxiway lines by: (1) computing a histogram of non-zero pixels in each column of the window; (2) determining the number of converging or diverging taxiway lines by determining the number of gaps in the histogram; and, (3) creating a window corresponding to each of the gaps, and fitting a line to the non-zero pixels in each of the created windows; and/or,
   c) determining horizontal taxiway lines by: (1) computing a histogram of non-zero pixels in each row of the window, and analyzing the peaks of the histogram; and, (2) creating a window in the direction of each horizontal taxiway line, and fitting a line to the non-zero pixels in each of the created windows.

9. The method of claim 8, additionally comprising: determining a cross-track error of the aircraft from the at least one of the determined vertical taxiway lines.

10. The method of claim 9, wherein the cross-track error is determined by performing template matching.

11. The method of claim 1, wherein the at least one clustering process includes at least one of:
   detecting taxiway lines of the one or more taxiway lines which are separate from each other; or,
   detecting taxiway lines of the one or more taxiway lines by separating intersecting taxiway lines from each other.

12. The method of claim 11, wherein the detecting the taxiway lines of the one or more taxiway lines which are separate from each other includes: applying a Density-Based Spatial Clustering of Applications with Noise (DBSCAN) process to the combined binary image.

13. The method of claim 11, wherein the detecting the taxiway lines of the one or more taxiway lines by separating intersecting taxiway lines from each other includes: detecting intersections of taxiway lines from the combined binary image, modifying the combined binary image including removing the non-zero pixels from the detected intersections of taxiway lines in the combined binary image; and, applying a DBSCAN process to the modified combined binary image.

14. The method of claim 13, wherein the detecting intersections of taxiway lines from the combined binary image comprises:
   processing the combined binary image including:
      analyzing a region of at least a predetermined number of pixels centered at each non-zero pixel in the combined binary image, and
      determining whether the number of non-zero pixels in the region exceeds a certain threshold number.

15. The method of claim 14, wherein the region is formed of quadrants and the determining whether the number of non-zero pixels in at least three of the quadrants of the region exceeds a certain threshold number.

16. The method of claim 13, wherein the removing the non-zero pixels from the detected intersections of taxiway lines includes: in the combined binary image, 1) defining a circular region including a radius of a predetermined number of pixels, and, 2) removing any non-zero pixels from the circular region.

17. The method of claim 1, additionally comprising: modeling at least one of the taxiway lines by fitting at least one of: 1) a line, or 2) a curve, through each group of non-zero pixels corresponding to a taxiway line in the subsequent digital image, prior to the tracking the one or more detected taxiway lines.

18. A computer system for detecting taxiway lines in an aerodrome, comprising:
   a non-transitory storage medium for storing computer components; and,
   a computerized processor for executing the computer components comprising:
      a module for obtaining digital images, including those of an aircraft indicative of the forward direction of movement of the aircraft;
      a module for detecting pixels corresponding to taxiway lines in at least one digital image of the obtained digital images including: 1) determining whether there are pixels matching a range of predetermined colors associated with taxiway lines, and, 2) determining whether there are pixels defining an edge of a taxiway line;
      a module for determining, in a subsequent digital image from at least one of the obtained digital images, whether the movement of the aircraft is at least in a substantially straight line by analyzing at least a portion of the at least one digital image corresponding to a region in front of the aircraft wherein:
         a) if the movement of the aircraft is at least in a substantially straight line along the taxiway, detecting one or more taxiway lines within the subsequent digital image comprising: generating a plurality of windows in succession in the at least one obtained digital image, to detect at least one taxiway line of the one or more taxiway lines for the aircraft to follow, each window of at least a predetermined number of pixels; and, the succession of each of the windows including positioning a successive window after a previous window to advance each successive window in a direction corresponding to at least one of the taxiway lines detected in the previous window, the at least one of the taxiway lines being detected based on analyzing the pixels in the previous window; or, b) if the movement of the aircraft is not at least in a substantially straight line, including turning movements of the aircraft along the taxiway, detecting one or more taxiway lines within the subsequent digital image comprising: applying at least one clustering process to the pixels of the at least one obtained digital image to detect the one or more taxiway lines; and, a module for tracking the one or more detected taxiway lines, as coordinated with the movement of the aircraft, by analyzing multiple successive frames of the obtained at least one digital image in the successive order of the frames until the one or more taxiway lines are no longer detected in a predetermined number of consecutive frames.

19. The system of claim 18, additionally comprising a camera, the camera for: 1) mounting on the aircraft, and, 2) for capturing digital images indicative of the forward direction of movement of the aircraft; and, the camera in electronic communication with the module for obtaining digital images.

20. A computer usable non-transitory storage medium having a computer program embodied thereon for causing a suitably programmed system to detect taxiway lines in an aerodrome, by performing the following steps when such program is executed on the system, the steps comprising:

obtaining digital images of an aircraft indicative of the forward direction of movement of the aircraft;

detecting pixels corresponding to taxiway lines in a digital image of the obtained images including: 1) determining whether there are pixels matching a range of predetermined colors associated with taxiway lines, and, 2) determining whether there are pixels defining an edge of a taxiway line;

determining, in a subsequent digital image of the obtained digital images, whether the movement of the aircraft is at least in a substantially straight line by analyzing at least a portion of the subsequent digital image corresponding to a region in front of the aircraft wherein:

a) if the movement of the aircraft is at least in a substantially straight line along the taxiway, detecting one or more taxiway lines within the subsequent digital image comprising: generating a plurality of windows in succession in the subsequent digital image, to detect at least one taxiway line of the one or more taxiway lines for the aircraft to follow, each window of at least a predetermined number of pixels, and, the succession of each of the windows including positioning a successive window after a previous window to advance each successive window in a direction corresponding to at least one of the taxiway lines detected in the previous window, the at least one of the taxiway lines being detected based on analyzing the pixels in the previous window; or, b) if the movement of the aircraft is not at least in a substantially straight line, including turning movements of the aircraft along the taxiway, detecting one or more taxiway lines within the subsequent digital image comprising: applying at least one clustering process to the pixels of the subsequent at least one digital image to detect the one or more taxiway lines; and, tracking the one or more detected taxiway lines, as coordinated with the movement of the aircraft, by analyzing multiple successive frames of the obtained digital images in the successive order of the frames until the one or more taxiway lines are no longer detected in a predetermined number of consecutive frames.

* * * * *